UNITED STATES PATENT OFFICE.

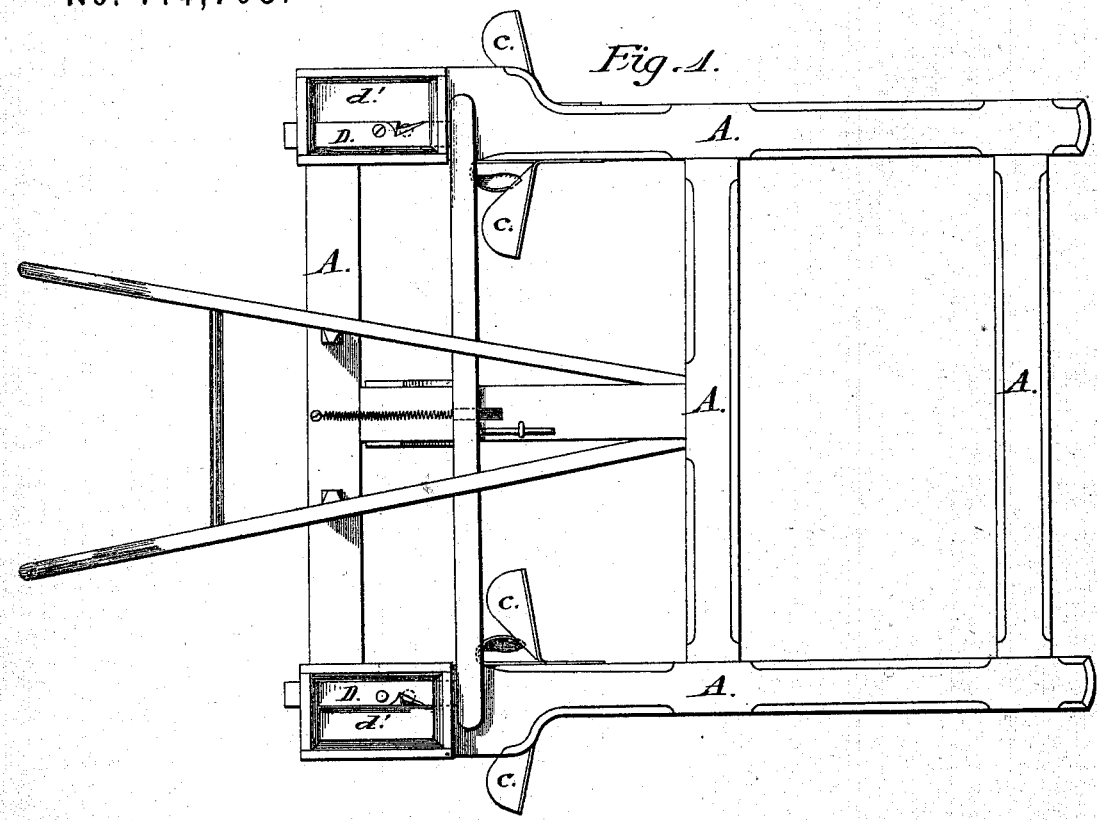

LEVI SIPE, OF KEEZLETOWN, VIRGINIA, ASSIGNOR OF ONE-HALF HIS RIGHT TO GEORGE R. EASTHAM, OF SAME PLACE.

IMPROVEMENT IN CORN-PLANTERS.

Specification forming part of Letters Patent No. 144,708, dated November 18, 1873; application filed October 23, 1873.

*To all whom it may concern:*

Be it known that I, LEVI SIPE, of Keezletown, in the county of Rockingham and State of Virginia, have invented a Corn-Planter, of which the following is a specification:

The first part of my invention relates to the combination of a circular wheel and half-wheel, united together and working in such manner that the said wheel and half-wheel cause the corn to be regularly deposited in the furrows at their intersection, as hereinafter described.

Figure 1 is a plan view of the machine. Fig. 2 is a detail view of seed-slides. Fig. 3 is a side view of the machine.

A is the frame of the planter, to which are attached two stocks, $a\ a$, having each a shovel, $b\ b$, for furrowing out the ground. Behind the shovels $b\ b$, and attached to the sides of the stocks $a\ a$ by bolts, are two flanges, $c\ c$, so shaped and designed to protect the furrow from clods and loose dirt. To the sides of the stocks $a\ a$, and working behind them, are attached two other shovels, $d\ d$, for covering the corn. B is a wheel revolving on its own spindle, and running on the ground when the machine is in motion until it strikes the cross-furrow, into which it drops, and, by its pressure against the opposing side of the furrow, causes the half-circular wheel C to revolve, which, by so doing, presses back the spring controlling the slide that opens or closes the boxes $d'\ d'$ containing the corn. Into this half-circular wheel C are inserted spikes or teeth, which assist its revolution, carrying with it the circular wheel B, until said wheel B again touches the ground and begins to revolve upon its own spindle. D is the dropper, which regulates the supply of corn to be deposited in the hill by means of a screw, which enlarges or diminishes at pleasure the size of the cup $e$ of said dropper.

In order to list or mark the ground to be planted the first way, the shovels $d\ d$ are removed from the stocks $a\ a$. After the ground has thus been laid off, the shovels $d\ d$ are again attached to the stocks $a\ a$ by means of bolts, when the machine is ready for planting and covering the corn.

I make no claim to the shovels for furrowing out the ground or covering the corn, or for anything in connection with the frame of the machine, for I am aware that these are not new; but

I claim as my invention—

1. The combination of the ground-wheel B and toothed half-wheel C, substantially as and for the purpose herein set forth.

2. In combination with the seed-slides and retraction spring, the wheel B, and toothed half-wheel C, as and for the purpose herein set forth.

LEVI SIPE.

Witnesses:
 RO. B. RAGAN,
 RAN. D. CUSHEN.